United States Patent [19]

Mulholland

[11] Patent Number: 5,380,774
[45] Date of Patent: Jan. 10, 1995

[54] NYLON MOLDING COMPOSITIONS EXHIBITING IMPROVED PROTECTION AGAINST UV-LIGHT DEGRADATION

[75] Inventor: Bruce M. Mulholland, Union, Ky.

[73] Assignee: Hoechst Celanese Corporation, Somerville, N.J.

[21] Appl. No.: 441,959

[22] Filed: Nov. 28, 1989

[51] Int. Cl.⁶ .................. C08K 5/3435; C08K 5/11; C08K 5/524

[52] U.S. Cl. .......................... 524/102; 524/91; 524/120; 524/291; 524/413; 524/424; 524/425; 524/430; 524/437; 524/439; 524/445; 524/449; 524/451; 524/456; 524/494; 524/495

[58] Field of Search ............... 524/91, 102, 120, 291, 524/425, 436, 437, 449, 451, 456, 413, 424, 430, 439, 445, 494

[56] References Cited

U.S. PATENT DOCUMENTS

| | | | |
|---|---|---|---|
| 2,493,597 | 1/1950 | Rothrock, Jr. et al. | 260/45.7 |
| 2,847,443 | 8/1958 | Hechenbleikner et al. | 260/461 |
| 2,849,414 | 8/1958 | Stott | 260/37 |
| 3,004,896 | 10/1961 | Heiler et al. | 167/90 |
| 3,282,886 | 11/1966 | Gadecki | 260/45.7 |
| 3,285,855 | 11/1966 | Dexter et al. | 252/57 |
| 3,322,718 | 5/1967 | Jacob | 260/45.8 |
| 3,324,072 | 6/1967 | Brignac | 260/37 |
| 3,502,613 | 3/1970 | Berger | 260/45.8 |
| 3,531,423 | 9/1970 | Stokes et al. | 260/18 |
| 3,533,986 | 10/1970 | Davy | 260/37 |
| 3,594,346 | 7/1971 | Hermann | 260/45.75 |
| 3,595,829 | 7/1971 | Davy | 260/45.8 |
| 3,644,482 | 2/1972 | Dexter et al. | 260/473 |
| 3,787,355 | 1/1974 | Linhart et al. | 260/45.75 |
| 3,839,392 | 10/1974 | Follows | 260/45.7 |
| 3,872,055 | 3/1975 | Furukawa et al. | 260/45.7 |
| 3,904,705 | 9/1975 | White | 260/857 |
| 3,935,163 | 1/1976 | Spivack et al. | 260/45.75 |
| 3,935,164 | 1/1976 | Spivack et al. | 260/45.75 |
| 3,960,809 | 7/1976 | Ramey et al. | 260/45.75 |
| 3,997,505 | 12/1976 | Albright | 524/120 |
| 4,001,181 | 1/1977 | Ramey et al. | 260/45.75 |
| 4,017,557 | 4/1977 | Hammer et al. | 260/857 |
| 4,044,200 | 8/1977 | Turbett | 174/23 |
| 4,069,199 | 1/1978 | Ramey et al. | 260/45.75 |
| 4,069,277 | 1/1978 | Mathis et al. | 260/857 |
| 4,093,588 | 6/1978 | Spivack et al. | 260/45.8 |
| 4,105,709 | 8/1978 | Iwami et al. | 260/857 |
| 4,174,385 | 11/1979 | Epstein | 525/183 |
| 4,185,004 | 1/1980 | Mathis | 260/45.8 |
| 4,198,334 | 4/1980 | Rasberger | 260/45.8 |
| 4,206,111 | 1/1980 | Valdiserri et al. | 260/45.8 |
| 4,226,763 | 10/1980 | Dexter et al. | 260/45.8 |
| 4,226,999 | 10/1980 | Malherbe et al. | 546/222 |
| 4,283,502 | 8/1981 | Richardson | 525/66 |
| 4,291,093 | 9/1981 | Wishman et al. | 428/379 |
| 4,302,383 | 11/1981 | Valdiserri et al. | 260/45.8 |
| 4,305,865 | 12/1981 | Okada et al. | 260/42.18 |
| 4,305,866 | 12/1981 | York et al. | 524/120 |
| 4,310,638 | 1/1982 | Coran et al. | 525/183 |
| 4,339,374 | 7/1982 | Olschewski et al. | 524/606 |
| 4,346,194 | 8/1982 | Roura | 525/66 |
| 4,348,495 | 9/1982 | Buysch et al. | 524/117 |
| 4,377,651 | 3/1983 | Leininger | 524/102 |
| 4,381,366 | 4/1983 | Sanderson et al. | 524/504 |
| 4,391,943 | 7/1983 | Scheetz | 524/538 |
| 4,426,471 | 1/1984 | Berner | 524/91 |
| 4,446,263 | 5/1984 | Bryant | 524/100 |
| 4,464,496 | 8/1984 | Nemzek et al. | 524/91 |
| 4,477,614 | 10/1984 | Dexter et al. | 524/91 |
| 4,478,978 | 10/1984 | Roura | 525/66 |
| 4,495,324 | 1/1985 | Chacko et al. | 524/504 |
| 4,536,541 | 8/1985 | Latham | 525/66 |
| 4,537,929 | 8/1985 | Nangrani | 524/504 |
| 4,540,727 | 9/1985 | Vogdes | 524/83 |
| 4,544,691 | 10/1985 | Dexter et al. | 524/99 |
| 4,551,495 | 11/1985 | Brassat et al. | 524/94 |
| 4,554,320 | 11/1985 | Reimann et al. | 525/183 |
| 4,612,222 | 9/1986 | Gaitskell | 428/35 |
| 4,617,339 | 10/1986 | Rocholl et al. | 524/514 |
| 4,670,489 | 6/1987 | Takahashi et al. | 524/103 |
| 4,694,042 | 9/1987 | McKee et al. | 525/66 |
| 4,707,513 | 11/1987 | Baer | 524/504 |
| 4,721,744 | 1/1988 | Ishii et al. | 524/91 |
| 4,724,247 | 2/1988 | Burton et al. | 524/128 |
| 4,730,015 | 3/1988 | Ikenaga et al. | 524/91 |
| 4,785,076 | 11/1988 | Shu | 524/91 |
| 4,818,793 | 4/1989 | Matthies et al. | 525/183 |
| 4,837,264 | 6/1989 | Zahradnik et al. | 524/381 |
| 4,851,473 | 7/1989 | Dunphy | 525/66 |

FOREIGN PATENT DOCUMENTS 155912  9/1985  European Pat. Off. .

OTHER PUBLICATIONS

Patent Abstracts of Japan, vol. 9, No. 180 (C-293)(1903), Jul. 25, 1985. Plasdoc–Central Patents Index–Basic Abstracts Journal, 1989, London, AN 89-072708 "Polyamide resin compsn.".

*Primary Examiner*—Kriellion S. Morgan
*Attorney, Agent, or Firm*—Nixon & Vanderhye

[57] ABSTRACT

Nylon molding compositions, and molded parts formed of the same, include a UV-light stabilization system having between about 0.5 to about 1.0 wt. % of a hindered phenolic antioxidant, between about 0.05 to about 1.5 wt. % of a phosphite compound, between about 0.05 to about 1.5 wt. % of a hindered amine light stabilizer, and optionally, between about 0.05 to about 5.0 wt. % of a benzotriazole UV absorber. The nylon molding compositions and molded parts formed thereof exhibit improved color difference, as calculated in CIELab units under illuminant "D-65" according to ASTM Standard D-2244, of less than about 1.5 when exposed to 601.6 kJ/$m^2$ irradiation in a Xenon arc weatherometer operated according to SAE J1885, and improved surface gloss retention characteristics after such irradiation.

20 Claims, No Drawings

NYLON MOLDING COMPOSITIONS EXHIBITING IMPROVED PROTECTION AGAINST UV-LIGHT DEGRADATION

FIELD OF THE INVENTION

The present invention relates generally to nylon molding compositions. More specifically, the present invention is related to nylon molding compositions which exhibit improved ultraviolet ("UV") light stability—that is, nylon molding compositions that exhibit improved protection against the degradative effects of UV light.

BACKGROUND AND SUMMARY OF THE INVENTION

A variety of conventional engineering resins, including nylon, are known to degrade physically when exposed to UV light for prolonged periods of time. In this regard, the degradative effects of such UV light exposure may impair the resin's physical properties (e.g., toughness and/or tensile strength), as well as deleteriously altering the color retention (and hence the visual appearance) of parts formed from such resin. In particular, nylon resins are known to exhibit a distinct and visually noticeable color change when exposed to the degradative effects of UV light.

A number of engineering resins, including nylon, have been proposed in recent years as candidates for structural applications historically served by metals. For example, nylon has been proposed as a material to form molded automotive parts (e.g., molded components for use on the interior and/or exterior of an automobile). Needless to say, any color change of the original molded nylon resin is unacceptable when used as a part for an automobile, particularly a part that is visible.

A number of proposals exist in the art with stated object to impart improved stability to nylon compositions. For example, in U.S. Pat. No. 4,540,727 to Vogdes, polyamide (i.e., nylon) compositions are proposed to be stabilized against high temperature exposure via the incorporation of antioxidants selected from (a) aromatic compounds containing amine groups, (b) aromatic mercapto compounds and salts thereof (e.g., metal salts of 2-mercapto benzothiazole), and (c) compounds containing at least one hindered phenol moiety.

According to U.S. Pat. No. 3,787,355 to Linhart et al, polyamide compositions are stabilized via a ternary system comprised of phenolic antioxidant, a phosphorus derivative, and a salt of divalent manganese.

U.S. Pat. Nos. 3,935,163 and 3,935,164 each to Spivack et al disclose the stabilization of a number of polymeric materials, including polyamides, by incorporating therein a nickel bis-3,5-dialkyl-4-hydroxybenzoate, an ultraviolet light absorber, such as a benzophenone or a benzotriazole, and optionally, a primary phenolic antioxidant with or without a secondary sulfur containing antioxidant. The '163 patent further discloses incorporating a light stabilizer, such as a p-hydroxybenzoate ester, with the other components of the stabilization system.

The Society of Automotive Engineers ("SAE") has recently recommended a new test method, designated SAE J1885, by which the color retention (i.e., lightfastness) of resin components intended to be utilized as interior trim parts for automobiles is measured. This test method, when applied to nylon components, generally involves subjecting nylon samples to a Xenon arc weatherometer for a time sufficient to ensure that the samples have received a total irradiation of 601.6 kilojoules per square meter ($kJ/m^2$).

Thus, while the proposals of the prior art discussed above, may impart some UV-light stability characteristics to nylon molding compositions, improvements are still needed. And, these improvements are particularly needed where it is desired to have nylon components pass the stringent requirements of SAE J1885. It is towards attaining such improvements in the UV-light stability of nylon compositions that the present invention is directed.

Broadly, the present invention resides in the discovery that a certain synergistic combination of stabilizers enable nylon samples to exhibit a color difference, as calculated in CIELab units under illuminant "D-65", of less than about 1.5 (usually less than about 1.0) when exposed to 601.6 $Kj/m^2$ irradiation in a Xenon arc weatherometer operated according to SAE J1885, and moreover, retain at least about 70% (usually at least about 90%) of the original surface gloss which is present prior to UV-light exposure.

The novel nylon compositions of this invention are realized by blending with a nylon base resin a color-retentive sufficient amount of a stabilization system comprised of (i) a hindered phenolic antioxidant, (ii) a phosphite compound, (iii) a hindered amine light stabilizer, and optionally (iv) a benzotriazole UV absorber.

DETAILED DESCRIPTION OF THE PREFERRED EXEMPLARY EMBODIMENTS

Any suitable nylon may be employed as the base resin in the compositions according to the present invention. In this regard, the nylon compositions according to the present invention will comprise at least about 30% by weight of the composition, and usually greater than about 75 wt. %, of the nylon base resin.

The nylon base resin may be virtually any polyamide resin prepared, for example, by polymerization of diamines and dicarboxylic acids and/or of aminocarboxylic acids or the corresponding lactams as is well known per se. The preferred nylons will therefore have polyamide units of the following structural formula:

$$-NH-(CH_2)_n-CO-$$

where n is an integer which is preferably 6, 9, 10, 11 or 12. The nylon base resin will preferably have essentially 100% of the units represented by the above formula, but it may also contain units derived from other non-polyamides, for example, olefin polymers. In such a case the copolyamide will contain at least about 75% of the above polyamide units in the polymeric chain.

Particularly preferred nylon base resins for use in the compositions of the present invention include nylon-6 (polycaprolactam), nylon-6,6 (polyhexamethylene adipamide), nylon-6,9 (polyhexamethylene azelaamide), nylon-6,10 (polyhexamethylene sebacamide), nylon-6,12 (polyhexamethylene dodecanoamide), nylon-11 (polyundecanoamide), and nylon-12 (polydodecanoamide).

The stabilization system includes as essential components (i) a hindered phenolic antioxidant, (ii) a phosphite compound, and (iii) a hindered amine light stabilizer, and includes as an optional component (iv) a benzotriazole UV absorber.

The hindered phenolic antioxidant is preferably present in the compositions of this invention in an amount between about 0.05 to about 1.0 weight percent, and more preferably between about 0.1 to about 0.3 (typically about 0.2) weight percent. The preferred hindered phenolic antioxidants are of the class of esterified hindered phenol substituted acid stabilizers disclosed more fully in U.S. Pat. Nos. 3,285,855 and 3,644,482 (the entire content of each being expressly incorporated hereinto by reference). These preferred hindered phenolic antioxidants are commercially available, for example, from Ciba-Geigy Corporation under the tradename Irganox TM. The most preferred hindered phenolic antioxidant which may be employed successfully in the compositions of this invention is tetrakis(methylene(3,5-di-tert-butyl-4-hydroxyhydrocinnamate))methane which is commercially available from Ciba-Geigy Corporation under the tradename Irganox TM 1010.

The phosphite compounds are preferably employed in the compositions of the present invention in an amount between about 0.05 to about 1.5 weight percent, and more preferably between about 0.15 to about 0.35 (typically about 0.20) weight percent. The most preferred phosphite compounds will be of the class of pentaerythritol diphosphites disclosed, for example, in U.S. Pat. No. 2,847,443 to Hechenbleikner et al (the entire content thereof being expressly incorporated hereinto by reference). The preferred pentaerythritol diphosphite compounds which may be employed successfully in the compositions of the present invention are commercially available, for example, from GE Specialty Chemicals under the tradename Ultranox TM. The most preferred phosphite compound is bis(2,4-di-t-butylphenyl) pentaerythritol diphosphite commercially available from GE Specialty Chemicals under the tradename Ultranox TM 626.

The hindered amine light stabilizer is most preferably employed in the compositions of this invention in an amount between about 0.05 to about 1.5 weight percent, and more preferably between about 0.25 to about 0.50 weight percent (usually about 0.30 wt. %). The most suitable hindered amine light stabilizers are those esters and amides from 4-hydroxy and 4-amino-polyalkyl-piperidines and hydroxybenzylmalonic acids substituted at the central carbon atom with an organic residue, preferably alkyl-, esteralkyl- or phosphonoalkyl-groups as more fully disclosed in U.S. Pat. No. 4,198,334 to Rasberger (the entire content thereof being expressly incorporated hereinto by reference). This preferred class of hindered amine light stabilizers is commercially available from Ciba-Geigy Corporation under the tradename Tinuvin TM 144(i.e., bis(1,2,2,6,6-pentamethyl-4piperidinyl)(3,5,-di-t-butyl-4-hydroxybenzyl)butylpropanedioate.

Although not essential, it has been found that the addition of a benzotriazole UV absorber enhances the color retentiveness (i.e., according to SAE J1885) for some colorant-containing nylon compositions according to the present invention. Thus, as an optional component, the nylon compositions of this invention, particularly those having a relatively dark (e.g., red or maroon) color, it is preferred that the benzotriazole UV absorber also be present in an amount between about 0.05 to about 5.0 weight percent, and more preferably between about 0.25 to about 0.50 weight percent (usually about 0.30 wt. %). The preferred class of benzotriazole UV light absorber that is employed in the compositions of the present invention is 2-aryl-2H-benzotriazoles as disclosed more fully in U.S. Pat. No. 4,226,763 to Dexter et al (the entire content of the same being expressly incorporated herein by reference). The most preferred benzotriazole UV absorber is 2-(3′,5′-bis (1-methyl-1-phenylethyl)-2′-hydroxyphenyl) benzotriazole which is commercially available from Ciba-Geigy Corporation under the tradename Tinuvin TM 234.

A variety of impact modifiers may also be blended with the nylon base resin to achieve a desired amount of impact resistance. Preferred impact modifiers for use in the compositions of the present invention are ethylene-propylene copolymers (EPDM) and/or ethylene-methacrylic acid di- and ter-polymers. If present, these impact modifiers will typically be employed in amounts between 1 to about 65 percent by weight, based on the total weight of the composition.

The compositions of the present invention may also (or alternatively) include approximately 1 to 50 percent by weight (based upon the total weight of the composition) of filler materials. Representative filler materials include calcium silicate, silica, clays, talc, mica, polytetrafluoroethylene, graphite, alumina, trihydrate, sodium aluminum carbonate, barium ferrite, pigments, etcetera.

Approximately 1 to 60 weight percent, and preferably 50 to 60 weight percent (based upon the total weight of the composition) of reinforcing agents may also be blended with the nylon compositions of this invention. Specific examples of such reinforcing materials include glass fibers, graphitic carbon fibers, amorphous carbon fibers, synthetic polymeric fibers, aluminum fibers, titanium fibers, steel fibers, tungsten fibers, and ceramic fibers, to name just a few.

The additives may be mixed with the nylon base resin in any expedient fashion. For example, the additives and nylon base resin may be mixed by dry-blending in a Henschel mixer followed by melt extrusion and pelletizing; by milling between two heated rolls and chopping into molding granules; or by milling in Banbury mixer or Brabender Plastograph.

The invention will be further illustrated by way of the following Examples, which are to be considered to be illustrative only, and non-limiting.

EXAMPLES

Nylon resin was preblended in dry form with various additives as shown in the accompanying Tables. The dry blend was then extruded and pelletized via a single-screw or twin-screw extruder operated at 288° C. and 100 rpm. These pelletized samples were then injection molded into test plaques on a reciprocating screw machine operated at 288° C.

These test plaques were then employed to determine the physical properties of the nylon compositions, particularly with respect to "color difference" and "percent gloss retention". In this regard, the "color difference" data in the following Tables was obtained by exposing the test plaques to UV light and heat in a Xenon arc weatherometer which was operated according to automotive test procedure SAE J1885. The primary conditions of the SAE J1885 test procedure are:

|  | Light Cycle | Dark Cycle |
| --- | --- | --- |
| Irradiance, W/m$^2$ | 0.55 | — |
| Black Panel Temp., °C. | 89 | 38 |
| Relative Humidity, % | 50 | 100 |
| Cycle Time, Hrs. | 3.8 | 1.0 |

The Xenon arc weatherometer employed in the testing was of the water-cooled, controlled irradiance type.

The amount of exposure was measured in terms of the total irradiation the test plaques received, expressed in kilojoules per square meter (kJ/m$^2$).

The degree of color change was determined instrumentally by measuring the color of the exposed specimens versus the color of the unexposed specimen. The degree of color change is quantified as the total color difference (delta E*), calculated in all cases for illuminant "D-65", 10-degree observer, specular included, expressed in CIELab units, in accordance with ASTM D-2244.

The "percent gloss retention" was determined by measuring the 60-degree gloss of the test plaques prior and subsequent to exposure to the Xenon arc weatherometer using a Gardner Multi-Angle Glossgard gloss meter operated according to ASTM 523. The gloss retention of each of the test plaques was therefore obtained by dividing the gloss measurement of the exposed specimen by the gloss measurement of the unexposed specimen, with the resulting number being expressed as a percentage.

The nylon base resins and additives employed in the nylon compositions noted in the accompanying Tables have the following meanings:

Nylon 6030—Nylon 6,6 resin impact modified with ethylene-propylene copolymer (EPDM), Hoechst Celanese Corporation.

ST801 BK-010—Dupont Zytel® impact modified standard black nylon, i.e., nylon 6,6 resin impact modified with ethylene-propylene copolymer (EPDM), ST801 W-BK-195—Dupont Zytel® impact modified UV-stable black nylon i.e., nylon 6,6 resin impact modified with ethylene-propylene copolymer (EPDM) and stabilized against UV-light degradation.

Irganox TM 1010—tetrakis(methylene(3,5-di-t-butyl-4-hydroxyhydrocinnamate))methane, Ciba Geigy Corporation Irganox TM 3125—3,5-di-tert-butyl-4-hydroxy hydrocinnamic acid triester with 1,3,5-tris (2-hydroxyethyl)-s-triazine-2,4,6(1H, 3H, 5H)-trione, Ciba-Geigy Corporation Ultranox TM 626—bis(2,4-di-t-butylphenyl) pentaerythritol diphosphite, GE Specialty Chemicals Tinuvin TM 144—bis(1,2,2,6,6-pentamethyl-4-piperidinyl)(3,5-di-t-butyl-4-hydroxybenzyl)butyl propanedioate, Ciba-Geigy Corporation Tinuvin TM 234—2-(3′,5′-bis(1-methyl-1-phenylethyl)-2′-hydroxyphenyl)benzotriazole, Ciba-Geigy Corporation Tinuvin TM 770—bis(2,2,6,6-tetramethyl-4-piperidinyl)sebacate, Ciba-Geigy Corporation Cyasorb® UV5411—2-(2-hydroxy-5-t-octylphenyl)-benzotriazole, American Cyanamid Mixxim TM HALS 63—[1,2,2,6,6-pentamethyl-4-piperidyl/β.β,β′,β′-tetramethyl-3,9-(2,4,8,10-tetraoxaspiro (5,5) undecane)diethyl]-1,2,3,4-butanetetracarboxylate, Fairmount Chemical Co., Inc.

Example 1

Various antioxidants and UV-light absorbers were incorporated into an impact modified nylon resin (Nylon 6030) as shown in the accompanying Table 1. The test plaques formed from these nylon compositions were then exposed to a Xenon arc weatherometer according to SAE J1885 as described previously, the resulting data being shown in Table 1 as the "color difference". In addition, a subjective surface erosion evaluation was conducted on a scale of 1 to 5 for each sample after exposure to the Xenon arc weatherometer, with "1" being indicative of essentially no surface erosion, and "5" being indicative of severe surface erosion.

TABLE 1

| Sample No. | 1 | 2 | 3 | 4 | 5 | 6 | 7 | 8 | 9 | 10 | 11 | 12 | Control A |
|---|---|---|---|---|---|---|---|---|---|---|---|---|---|
| Nylon 6030 Nat | 97.8 | 97.8 | 97.8 | 97.6 | 97.6 | 97.7 | 97.7 | 97.7 | 97.7 | 97.7 | 97.3 | 97.0 | 99.0 |
| RM2125 Blk conc | 2.0 | 2.0 | 2.0 | 2.0 | 2.0 | 2.0 | 2.0 | 2.0 | 2.0 | 2.0 | 2.0 | 2.0 | 1.0 |
| Irganox 1010 | 0.2 | — | — | 0.2 | — | — | — | — | — | — | 0.2 | 0.2 | — |
| Ultranox 626 | — | 0.2 | — | 0.2 | 0.2 | — | — | — | — | — | 0.2 | 0.2 | — |
| Irganox 3125 | — | — | 0.2 | — | 0.2 | — | — | — | — | — | — | — | — |
| Tinuvin 144 | — | — | — | — | — | 0.3 | — | — | — | — | 0.3 | 0.3 | — |
| Tinuvin 770 | — | — | — | — | — | — | 0.3 | — | — | — | — | — | — |
| Mixxim HALS 63 | — | — | — | — | — | — | — | 0.3 | — | — | — | — | — |
| Cyasorb UV5411 | — | — | — | — | — | — | — | — | 0.3 | — | — | 0.3 | — |
| Tinuvin 234 | — | — | — | — | — | — | — | — | — | 0.3 | — | 0.3 | — |
| Color Difference | 2.2 | 1.0 | 2.4 | 1.2 | 1.0 | 1.3 | 1.4 | 1.2 | 2.4 | 2.4 | 0.4 | 0.5 | 1.2 |
| Surface rating | 3 | 4 | 4 | 3 | 4 | 4 | 3 | 3 | 4 | 4 | 1 | 1 | 5 |

The data in Table 1 shows that improving the UV-light stability of Nylon 6030 is achieved by a combination of a hindered phenolic antioxidant (Irganox TM 1010), a phosphite (Ultranox TM 626), and a hindered amine light stabilizer (tinuvin TM 144) as evidenced by Sample No. 11, which exhibited a low color difference and good surface appearance of the exposed specimen. The use of each of these additives alone, however, in Nylon 6030 resulted in poor performance in terms of both the color difference and the surface appearance after exposure.

The result evidenced by Sample No. 10 was unexpected since it included a benzotriazole UV-light absorber (Tinuvin TM 234), a known UV-light absorbing compound. Thus, it was expected that the use of such a benzotriazole UV-light absorber would have resulted in improved UV-light stability. Note also that the use of this same benzotriazole UV-light absorber in Sample No. 12 also did not show any improved results over and above those obtained via the ternary system employed in Sample No. 11.

Example 2

The stabilizer systems used in Sample Nos. 11 and 12 of Example 1 were then applied to a variety of colored nylon compositions, as identified in the following Tables 2 through 7. For comparison purposes, two commercially available UV-light stable nylon (DuPont Zytel® ST801 BK-010 and ST801 W-BK-195 nylon grades) were also tested. Color difference and percent gloss retention data were obtained for each composition per the procedures outlined previously.

TABLE 2

Product: Impact Modified Nylon
Color: Black

|  | Control B | Control C | Control A | Sample 13 | Sample 14 |
|---|---|---|---|---|---|
| ST801 BK-010 | 100 | — | — | — | — |
| ST801 W-BK-195 | — | 100 | — | — | — |
| Nylon 6030 | — | — | 99.75 | 99.05 | 98.75 |
| Carbon black | — | — | 0.25 | 0.25 | 0.25 |
| Irganox 1010 | — | — | — | 0.20 | 0.20 |
| Ultranox 626 | — | — | — | 0.20 | 0.20 |
| Tinuvin 144 | — | — | — | 0.30 | 0.30 |
| Tinuvin 234 | — | — | — | — | 0.30 |
| Color difference | 1.6 | 2.5 | 1.2 | 0.9 | 1.1 |
| % Gloss Retention | 40.9 | 56.5 | 49.6 | 88.3 | 96.5 |

TABLE 3

Product: Impact Modified Nylon
Color: Blue

|  | Control D | Sample 15 | Sample 16 |
|---|---|---|---|
| Nylon 6030 | 96.14 | 95.44 | 95.14 |
| Colorants | 3.86 | 3.86 | 3.86 |
| Irganox 1010 | — | 0.20 | 0.20 |
| Ultranox 626 | — | 0.20 | 0.20 |
| Tinuvin 144 | — | 0.30 | 0.30 |
| Tinuvin 234 | — | — | 0.30 |
| Color Difference | 3.8 | 1.0 | 1.1 |
| % Gloss Retention | 13.7 | 97.2 | 98.1 |

TABLE 4

Product: Impact Modified Nylon
Color: Gray

|  | Control E | Sample 17 | Sample 18 |
|---|---|---|---|
| Nylon 6030 | 99.34 | 98.64 | 98.34 |
| Colorants | 0.66 | 0.66 | 0.66 |
| Irganox 1010 | — | 0.20 | 0.20 |
| Ultranox 626 | — | 0.20 | 0.20 |
| Tinuvin 144 | — | 0.30 | 0.30 |
| Tinuvin 234 | — | — | 0.30 |
| Color Difference | 4.5 | 0.8 | 0.8 |
| % Gloss Retention | 20.2 | 95.1 | 97.2 |

TABLE 5

Product: Impact Modified Nylon
Color: Red

|  | Control F | Sample 19 | Sample 20 |
|---|---|---|---|
| Nylon 6030 | 98.09 | 97.39 | 97.09 |
| Colorants | 1.91 | 1.91 | 1.91 |
| Irganox 1010 | — | 0.20 | 0.20 |
| Ultranox 626 | — | 0.20 | 0.20 |
| Tinuvin 144 | — | 0.30 | 0.30 |
| Color Difference | 1.6 | 1.0 | 0.9 |
| % Gloss Retention | 48.9 | 93.1 | 100 |

TABLE 6

Product: Impact Modified Nylon
Color: Tan

|  | Control G | Sample 21 | Sample 22 |
|---|---|---|---|
| Nylon 6030 | 98.50 | 97.80 | 97.50 |
| Colorants | 1.50 | 1.50 | 1.50 |
| Irganox 1010 | — | 0.20 | 0.20 |
| Ultranox 626 | — | 0.20 | 0.20 |
| Tinuvin 144 | — | 0.30 | 0.30 |
| Tinuvin 234 | — | — | 0.30 |

TABLE 6-continued

Product: Impact Modified Nylon
Color: Tan

|  | Control G | Sample 21 | Sample 22 |
|---|---|---|---|
| Color Difference | 1.9 | 0.8 | 0.7 |
| % Gloss Retention | 15.0 | 92.0 | 95.5 |

TABLE 7

Product: Impact Modified Nylon
Color: Maroon

|  | Control H | Sample 23 | Sample 24 |
|---|---|---|---|
| Nylon 6030 | 99.00 | 98.30 | 98.00 |
| Colorants | 1.00 | 1.00 | 1.00 |
| Irganox 1010 | — | 0.20 | 0.20 |
| Ultranox 626 | — | 0.20 | 0.20 |
| Tinuvin 144 | — | 0.30 | 0.30 |
| Tinuvin 234 | — | — | 0.30 |
| Color Difference | 2.2 | 1.2 | 0.9 |
| % Gloss Retention | 28.9 | 62.7 | 96.2 |

The above data clearly demonstrate that the compositions according to the present invention showed significant improvement in UV-light stability as compared to nylon compositions which did not include the stabilizers as determined by the color difference and the percent gloss retention. Table 2 also demonstrates the improvement in the UV-light stability of the compositions according to the present invention as compared to commercially available nylon grades typically sold for applications requiring UV-light stability. In this regard, the color difference and gloss retention data should be compared for Sample No. 14 according to this invention, and the commercially available nylon composition represented by DuPont Zytel ® ST801 W-BK-195.

In addition, it will be observed that, for the maroon color of Table 7, the inclusion of a benzotriazole UV-light absorber resulted in improved stability properties. Thus, for some colorants, the inclusion of a benzotriazole UV-light absorber in addition to a hindered phenolic antioxidant, a phosphite compound, and a hindered amine light stabilizer is preferred.

Example 3

Example 2 was repeated, with the exception that standard unfilled, heat stabilized, and glass-reinforced nylon grades (nylon 6,6, Hoechst Celanese Corporation) were employed as the base resin. The resulting samples were tested for color difference and percent surface gloss retention per the procedures noted previously. The results appear in the following Tables 8 through 12.

TABLE 8

Product: Unfilled Nylon 1000-2
Color: Black (up to 2%)

|  | Control I | Control J | Control K | Sample 25 | Sample 26 | Sample 27 |
|---|---|---|---|---|---|---|
| Nylon 1000 | 98.97 | 97.97 | 91.97 | 97.97 | 96.97 | 90.97 |
| Zinc Stearate | 0.03 | 0.03 | 0.03 | 0.03 | 0.03 | 0.03 |
| RM 2125 Blk Conc | 1.00 | 2.00 | 8.00 | 1.00 | 2.00 | 8.00 |
| Irganox 1010 | — | — | — | 0.20 | 0.20 | 0.20 |
| Ultranox 626 | — | — | — | 0.20 | 0.20 | 0.20 |
| Tinuvin 144 | — | — | — | 0.30 | 0.30 | 0.30 |
| Tinuvin 234 | — | — | — | 0.30 | 0.30 | 0.30 |
| Color difference | 0.4 | 0.5 | 1.3 | 1.4 | 1.0 | 0.6 |
| % Gloss Retention | 52.6 | 43.3 | 66.9 | 99.3 | 96.6 | 78.0 |

TABLE 9

Product: Heat Stabilized Nylon 1003-2
Color: Black

|  | Control L | Sample 28 |
|---|---|---|
| Nylon 1003 | 98.97 | 97.97 |
| Zinc Stearate | 0.03 | 0.03 |
| RM2125 Blk Conc | 1.00 | 1.00 |
| Irganox 1010 | — | 0.20 |
| Ultranox 626 | — | 0.20 |
| Tinuvin 144 | — | 0.30 |
| Tinuvin 234 | — | 0.30 |
| Color difference | 1.1 | 1.2 |
| % Gloss Retention | 100 | 99.0 |

TABLE 10

Product: Glass-reinforced 1500-2
Color: White

|  | Control M | Sample 29 |
|---|---|---|
| Nylon 1500 | 98.97 | 97.97 |
| Zinc Stearate | 0.03 | 0.03 |
| Colorants | 1.00 | 1.00 |
| Irganox 1010 | — | 0.20 |
| Ultranox 626 | — | 0.20 |
| Tinuvin 144 | — | 0.30 |
| Tinuvin 234 | — | 0.30 |
| Color difference | 5.5 | 2.4 |
| % Gloss Retention | 5.5 | 96.8 |

TABLE 11

Product: Glass-reinforced 1500-2
Color: Yellow

|  | Control N | Sample 30 |
|---|---|---|
| Nylon 1500 | 99.11 | 98.11 |
| Zinc Stearate | 0.03 | 0.03 |
| Colorants | 0.86 | 0.86 |
| Irganox 1010 | — | 0.20 |
| Ultranox 626 | — | 0.20 |
| Tinuvin 144 | — | 0.30 |
| Tinuvin 234 | — | 0.30 |
| Color difference | 6.0 | 1.4 |
| % Glass Retention | 14.2 | 99.0 |

TABLE 12

Product: Glass-reinforced 1500-2
Color: Black

|  | Control M | Sample 29 |
|---|---|---|
| Nylon 1500 | 98.97 | 97.97 |
| Zinc Stearate | 0.03 | 0.03 |
| RM2125 Blk Conc | 1.00 | 1.00 |
| Irganox 1010 | — | 0.20 |
| Ultranox 626 | — | 0.20 |
| Tinuvin 144 | — | 0.30 |
| Tinuvin 234 | — | 0.30 |
| Color difference | 1.5 | 1.1 |
| % Gloss Retention | 11.6 | 82.8 |

The results of Tables 8 through 12 show that, except for the heat stabilized nylon grade, all compositions according to the present invention exhibited significant improvement in color difference and surface gloss retention. The data with respect to the heat stabilized nylon grade showed that no improvement in UV-light stability was obtained, however the additives did not cause any adverse effect either. Although the reason for this data is not presently understood, it is surmised that the heat stabilizers present in that nylon grade apparently counteract the functionality of the combination of a phenolic anitoxidant, a phosphite compound and a hindered amine compound.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nylon molding composition comprising a nylon base resin and a stabilization system which is present in said composition in an amount sufficient to achieve a color difference, as calculated in CIELab units under illuminant "D-65" according to ASTM Standard D-2244, of less than about 1.5 when exposed to 601.6 kJ/m$^2$ irradiation in a Xenon arc weatherometer operated according to SAE J1885, and exhibiting at least about 75% surface gloss retention after irradiation, and wherein said stabilization system includes:
   (i) a hindered phenolic antioxidant in the form of tetrakis(methylene(3,5-di-tert-butyl-4-hydroxy-hydrocinnamate)) methane;
   (ii) a phosphate compound in the form of bis(2,4-di-t-butylphenyl) pentaerythritol diphosphite;
   (iii) a hindered amine light stabilizer in the form of bis(1,2,2,6,6-pentamethyl-4-piperidinyl)(3,5-di-t-butyl-4-hydroxybenzyl)butyl-propanedioate; and optionally
   (iv) a benzotriazole UV-light absorber in the form of 2-(3',5'-bis(1-methyl-1-phenylethyl)-2'-hydroxyphenyl benzotriazole.

2. A nylon molding composition as in claim 1, wherein said hindered phenolic antioxidant is present in an amount of between about 0.05 to about 1.0 percent by weight of the composition.

3. A nylon molding composition as in claim 1, wherein said phosphite compound is present in an amount between 0.05 to about 1.5 percent by weight of the composition.

4. A nylon molding composition as in claim 1, wherein said hindered amine light stabilizer is present in an amount of between about 0.05 to about 1.5 percent by weight of the composition.

5. A nylon molding composition as in claim 1, wherein said benzotriazole UV light absorber is present in an amount between about 0.05 to about 5.0 percent by weight of the compostion.

6. A nylon molding composition comprising, based on the total weight of the composition:
   (a) at least about 30% of a nylon base resin;
   (b) between about 0.05 to about 1.0% of an esterified hindered phenol-substituted acid stabilizer in the form of tetrakis(methylene(3,5-di-tert-butyl-4-hydroxy-hydrocinnamate)) methane;
   (c) between about 0.05 to about 1.5% of a pentaerythritol diphosphite compound in the form of bis(2,4-di-t-butylphenyl) pentaerythritol diphosphite; and
   (d) between about 0.05 to about 1.5% of a hindered amine light stabilizer selected from the group consisting of esters and amides of 4-hydroxy-polyalkyl piperidine and 4-amino-polyalkylpiperidine compounds substituted at the central carbon atom with an organic group selected from alkyls, esteralkyls, and phosphonoalkyls; and wherein
   said molding composition exhibits a color difference, as calculated in CIELab units under illuminant "D-65" according to ASTM Standard D-2244, of less than about 1.5 when exposed to 601.6 kJ/m$^2$ irradiation in a Xenon arc weatherometer operated according to SAE J1885, and exhibiting at least about 75% surface gloss retention after irradiation.

7. A nylon molding composition as in claim 6, wherein
said hindered phenol substituted acid stabilizer is present in an amount between 0.10 to about 0.30%;
said pentaerythritol diphosphite compound is present in an amount between about 0.15 to about 0.35%; and
said hindered amine light stabilizer is present in an amount between about 0.25 to about 0.50%.

8. A nylon molding composition as in claim 6, further comprising:
(e) between about 0.05 to about 5.0% of a 2-aryl-2H-benzotriazole UV light absorber.

9. A nylon molding composition as in claim 8, wherein said 2-aryl-2H-benzotriazole UV light absorber is present in an amount between about 0.25 to about 0.50%.

10. A nylon molding composition as in claim 6, which further comprises at least one component selected from the group consisting of fillers, colorants, reinforcing agents, and impact modifiers.

11. A nylon molding composition as in claim 10, wherein said fillers include at least one selected from the group consisting of calcium silicate, silica, clay, talc, mica, polytetrafluoroethylene, graphite, alumina, trihydrate, sodium aluminum carbonate, and barium ferrite.

12. A nylon molding composition as in claim 10 wherein said reinforcing agent includes a reinforcing amount of fibers selected from the group consisting of glass, graphitic carbon, amorphous carbon, synthetic polymeric, aluminum, titanium, steel, tungsten, and ceramic fibers.

13. A nylon molding composition as in claim 6, which further comprises an impact modifying effective amount of at least one impact modifier selected from the group consisting of ethylene-propylene copolymers and ethylene-methacrylic acid di- and ter-polymers.

14. A nylon molding composition as in claim 6, which further comprises a colorant in an amount effective to impart a desired color to said composition.

15. A molded part which consists essentially of a nylon molding composition as in claim 1, 6 or 10.

16. A molded part having improved UV-light stability such that said molded part exhibits a color difference, as calculated in CIELab units under illuminant "D-65" according to ASTM Standard D-2244, of less than about 3.5 when exposed to 601.6 kJ/m$^2$ irradiation in a Xenon arc weatherometer operated according to SAE J1885, and exhibiting at least about 75% surface gloss retention after irradiation, said molded part consisting essentially of a nylon molding composition which consists essentially of, based upon the total weight of the composition:
(a) a nylon base resin;
(b) between about 0.05 to about 1.0% of tetrakis(methylene(3,5-di-tert-butyl-4-hydroxyhydrocinnamate))methane; and
(c) between about 0.05 to about 1.5% of bis(2,4-di-t-butylphenyl) pentaerythritol diphosphite;
(d) between about 0.05 to about 1.5% of bis(1,2,2,6,6-pentamethyl-4-piperidinyl)(3,5-di-t-butyl-4-hydroxybenzyl)butylpropanedioate.

17. A molded part as in claim 16, which further comprises:
(e) between 0.05 to about 5.0% of 2-(3',5'-bis(1-methyl-1-phenylethyl)-2'hydroxyphenyl) benzotriazole.

18. A molded part as in claim 16 or 17, which further comprises at least one component selected from fillers, colorants, reinforcing agents and impact modifiers.

19. A molded part as in claim 16 or 17, which further comprises a colorant in an amount effective to achieve a desired color for said molded part.

20. A nylon molding composition as in claim 16, which further comprises an impact modifying effective amount of at least one impact modifier selected from the group consisting of ethylene-propylene copolymers and ethylene-methacrylic acid di- and ter-polymers.

* * * * *

UNITED STATES PATENT AND TRADEMARK OFFICE
CERTIFICATE OF CORRECTION

PATENT NO. : 5,380,774
DATED : January 10, 1995
INVENTOR(S) : Mulholland

It is certified that error appears in the above-identified patent and that said letters patent is hereby corrected as shown below:

Column 1, line 37, after "with" insert --a--

Signed and Sealed this

Sixteenth Day of May, 1995

*Attest:*

BRUCE LEHMAN

*Attesting Officer*            Commissioner of Patents and Trademarks